(No Model.)
G. WALL.
REVERSIBLE SCRAPER FOR SHIPS' SPARS.
No. 293,992. Patented Feb. 19, 1884.
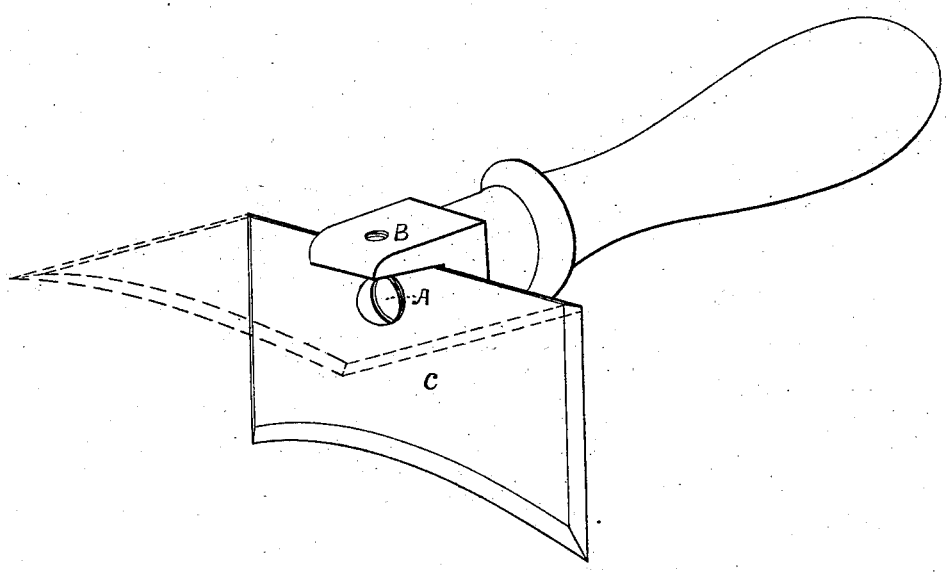
WITNESSES
INVENTOR

UNITED STATES PATENT OFFICE.

GEORGE WALL, OF FALL RIVER, MASSACHUSETTS.

REVERSIBLE SCRAPER FOR SHIPS' SPARS.

SPECIFICATION forming part of Letters Patent No. 293,992, dated February 19, 1884.

Application filed June 9, 1883. (No model.)

*To all whom it may concern:*

Be it known that I, GEORGE WALL, a citizen of the United States, residing at Fall River, in the county of Bristol and State of Massachusetts, have invented a new and useful Reversible Scraper, of which the following is a specification.

My invention relates to an improved implement for scraping ships' spars. Heretofore common implements in use for the purpose have been sheath-knives or pieces of old scythes, requiring both hands to use them, and, unless much care was used, leaving an uneven surface, while with my improvement one hand may be used, and a much smoother surface secured in less time.

My device is shown in perspective in the accompanying drawing, in which C is the blade, B the body, and A a screw used to attach the blade to the body. Three edges of the steel blade C are ground sharp, on a bevel, and the long sharp edge is also made concave, so that it may touch a larger portion of the surface of the spar, thereby greatly facilitating the operation of scraping, as well as leaving the surface smoother. The blade C is attached to the malleable-iron body B by means of the screw A, which passes through a suitable hole in the blade and screws into the body B. One end of the body forms a shank, which is inserted into the handle in the usual manner. The position of the blade may be changed by removing the screw A and blade B and replacing them on the upper side of the body, as shown by the dotted lines in the drawing, to facilitate working close to the deck.

I am aware that prior to my invention handled scrapers have been made and used, some of which have adjustable blades. I therefore do not claim such a combination, broadly; but What I do claim, and desire to secure by Letters Patent, is—

The combination, in a scraper, of a steel blade, C, having one concave edge, with the body B, which has two screw-holes to secure the blade in two positions, together with the handle, substantially as shown, and for the purpose specified.

GEORGE WALL.

Witnesses:
GEORGE E. POTTER,
HENRY H. EARL.